Figure 3:
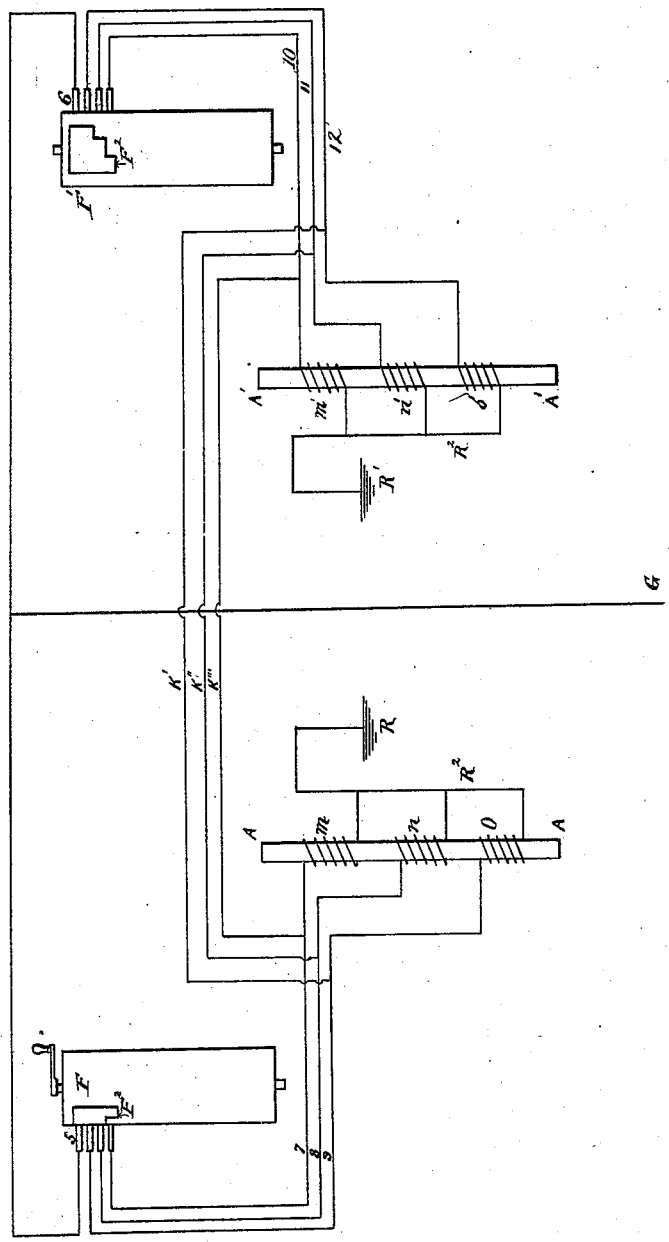

(No Model.)  2 Sheets—Sheet 1.
W. L. HEDENBERG.
ELECTRIC BRAKE.
No. 545,498.  Patented Sept. 3, 1895.
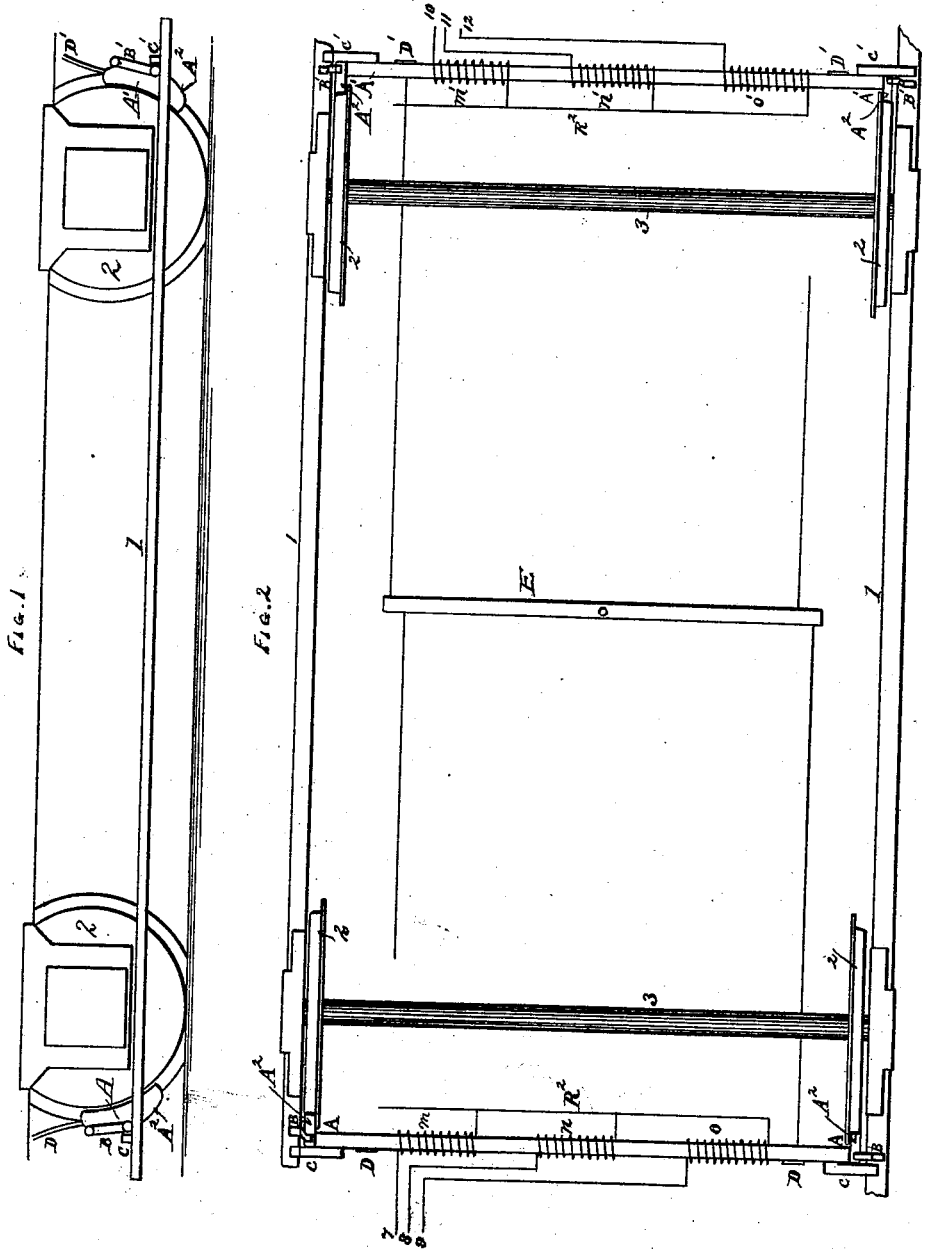
WITNESSES:
INVENTOR
Wm L. Hedenberg
BY
T. F. Bourne
his ATTORNEY.

(No Model.) 2 Sheets—Sheet 2.
W. L. HEDENBERG.
ELECTRIC BRAKE.

No. 545,498. Patented Sept. 3, 1895.

WITNESSES:
Purches Miles
S. B. Morss

INVENTOR
Wm L. Hedenberg
BY T. F. Bourne
his ATTORNEY.

UNITED STATES PATENT OFFICE.

WILLIAM L. HEDENBERG, OF NEW YORK, N. Y.

ELECTRIC BRAKE.

SPECIFICATION forming part of Letters Patent No. 545,498, dated September 3, 1895.

Application filed May 7, 1894. Serial No. 510,346. (No model.)

*To all whom it may concern:*

Be it known that I, WILLIAM L. HEDENBERG, a resident of the city, county, and State of New York, have invented certain new and useful Improvements in Electric Brakes, of which the following is a specification.

My invention relates to electric brakes, more especially applicable to street-railway cars or cars driven by electricity.

The object of my invention is to provide a direct-acting electric brake which can be pressed upon the wheels with more or less force, as desired.

The invention consists in utilizing the brake-shoes as poles of a magnet and the wheels of a car as the armatures therefor, so that when said shoes are magnetized they will act with the wheels like a magnet and armature, whereby the attraction between the shoes and the wheels will act to press the shoes against the wheels. The wheels, therefore, act substantially like the armatures of magnets, the shoes being the magnets which advance toward the wheels to create pressure on them.

The invention further consists in an iron bar extending transversely of the truck or car and having its ends located in proximity to the rims of the wheels and connected with the brake-shoes, said bar having one or more wire coils connected with a suitable electric source, so that when the current passes through the coils the iron bar and shoes will be magnetized, and thus act with the wheels as armatures to press the brake-shoes against the wheels.

The invention also consists in the novel details of improvement and the combinations of parts that will be more fully hereinafter set forth, and then pointed out in the claims.

Reference is to be had to the accompanying drawings, forming part hereof, wherein—

Figure 1 is a side elevation of a portion of a car or truck provided with my improved electric brake. Fig. 2 is a partly broken plan view thereof; and Fig. 3 is a diagrammatic view of the brake-bars or cores and the current-controllers, illustrating one manner of arranging the wires or conductors.

In the accompanying drawings, in which similar numerals and letters of reference indicate corresponding parts in the several views, the numeral 1 indicates the side bars of a suitable car-truck. 2 are the car-wheels, and 3 are the axles thereof, which may all be of ordinary or suitable construction, and it will be understood that my improved electric brake may be applied to any desired construction of car or truck.

A A' are bars extending transversely of the car or truck and having their ends in proximity to the rims of the wheels. (See Fig. 2.) These bars are the brake bars or beams, and are made of soft iron of suitable section, forming magnet-cores. The bars or cores A A' are pivotally supported, so as to have lateral motion toward and from the wheels. They are shown supported by Z-shaped pivots B B', having one leg entering an eye in the shoes, the other leg of each pivot being pivotally carried in a socket on the truck-frame 1; but of course the bars A A' may be supported in any desired manner to have movement toward or from the wheels. The pivot B and its socket on the truck will preferably be made of brass.

D D' are brass springs connected with the bars A A' and suitably attached to the truck, and arranged to normally hold the ends of the bars A A' a short distance away from the wheels, yet within the magnetic field.

C C' are brass pieces secured to the truck and arranged to be engaged by the bars A A' to limit their outward movement.

$A^2$ are the brake-shoes which are carried by, connected with, or formed integral with the bars A A', and arranged to be pressed against the rims of the wheels.

It will be understood that the construction and arrangement of all of the above-mentioned parts may be modified and changed as desired, and are here shown to illustrate one means for carrying out my invention.

The soft-iron bars A A' are to constitute magnet-cores or supports for said cores, and for this purpose upon said bars are wound coils of wire $m$ $n$ $o$ and $m'$, $n'$, and $o'$, respectively, which, when current passes through them, magnetize the bars and shoes, the shoes thereby becoming the poles of magnets. The wheels 2 thereupon act as armatures for the magnetic shoes, so that when the latter are magnetized they will be attracted or drawn toward the wheels to apply braking pressure to the latter. One or more coils may be placed on the bars or cores A A' to produce more or less magnetism, as may be desired. The coils are to be connected with suitable current-controllers or switches F F', carried on the platform or other part of the car. (Not shown.) Each coil may be wound for a current of any strength desired, and the controllers will be arranged to direct current through one or more of said coils at a time to produce more or less magnetism in the bars or cores A A' as desired. The coils may be supplied with current from storage or other batteries, or when used on trolley-cars or cars driven by electricity they can be connected with the wires leading to the motors. The wire G, being connected with a suitable source of current, leads to one contact 5 and 6 in the controllers F F', respectively. (See Fig. 3.) The wires 7 8 9 and 10 11 12, leading from the coils $m$ $n$ $o$ and $m'$, $n'$, and $o'$, respectively, pass to the corresponding contacts or terminals in the controllers F F', respectively, so that when a switch $F^2$ is turned one or more of the coils will be energized, as desired. The opposite end of each wire coil will lead to the return-wire of the battery (when used) or to ground R R' by wires $R^2$, which of course can be done by suitably electrically connecting said coils with the wheels.

In order to simultaneously operate both brakes A and A' at opposite ends of the car, the lead-wire G is shown connected with both controllers F F', and the wires 9 12, 8 11, and 7 10 are connected together by wires K' K'' K''', respectively, as shown in the diagram Fig. 3.

The operation is as follows: Suppose it is desired to apply the brakes lightly. The switch $F^2$ in one controller—say F—is turned to close the circuit through the wire 9, whereupon the current will divide and pass through wire K' to wire 12. Coils $o$ and $o'$ will now be energized so as to magnetize the shoes. These shoes thus magnetized will advance toward the wheels and press against the latter. If more braking-pressure is desired, the switch will be turned sufficiently far to include wire 8 in the circuit, whereby coils $n$ and $n'$ will now be in the circuit as well as coils $o$ and $o'$. Should a still greater braking-pressure be required, the switch $F^2$ will be turned to include the wire 7 in the circuit, whereupon all of the coils will be energized and the full magnetizing force will be supplied to the shoes. The same effect takes place when the controller F' is operated at the opposite end of the car, only one controller being operated at a time. Thus it will be seen that the operator or motorman can apply the desired pressure by merely turning the switch in the controller. The arrangement is such that when one controller is in operation the opposite one will be out of circuit, yet both sets of coils will be used simultaneously.

It will be understood that while I have shown two brake-bars A A' connected together electrically, one bar may be used alone or any desired number by correspondingly connecting the wires of the coils with the controller or switch.

The arrangement shown in Fig. 3 is not arbitrary, but is merely provided to illustrate one way of arranging the parts, and it will be observed that any desired arrangement of wiring may be used, and that the parts and arrangement may be varied without departing from the spirit of my invention.

For the sake of safety, in the case of an emergency, the bars A A' may be connected with any suitable form of hand-braking mechanism E, so that if the current should stop or any of the electrical connections or devices give out the car could be stopped by said mechanism E.

It will be understood that the magnetic attraction between the brake-shoes and the wheels also acts to retard the revolution of the wheel, as well as the pressure on the wheels.

Having now described my invention, what I claim is—

1. An electric brake, comprising a bar having shoes located in proximity to wheels, a plurality of coils on said bar immovable with relation to the bar, connections from said coil or coils to a source of power, and a controller arranged to throw one or more coils into circuit at a time, whereby said shoes will advance toward said wheels to apply the brake with more or less force, substantially as described.

2. In an electric brake, a bar having a plurality of coils immovable relatively to the bar and adapted to be drawn toward the wheels, combined with a controller adapted to throw one or more coils into circuit at a time, as and for the purposes specified.

3. In an electric brake, a pair of bars or cores provided with polar extensions each having a plurality of coils that are respectively connected together, circuit controllers for the coils of each of said bars, said controllers being arranged to throw one or more coils into circuit at a time, a lead wire or conductor passing to said controllers, and wheels in proximity to said bars, whereby both of said bars will be operated simultaneously to apply the brakes when the circuit is closed by one controller, through the coils of like relation to the polar extensions, substantially as described.

4. In an electric brake, the combination of a truck and wheels, with a bar pivotally carried thereby provided with polar extensions and having its ends in proximity to said wheels, shoes operated by said bar, springs to hold said bar away from said wheels, stop pieces to act with said springs, a plurality of coils on said bar to magnetize it, to cause it to approach the wheels, and a controller arranged to energize the coils of like relation to the polar extensions, substantially as described.

5. In an electro-magnetic brake, the combination with a moving element, of a core provided with a polar extension, coils wound on the core at different points along its length and immovable relatively thereto, and means for cutting-in one or all of the coils, substantially as set forth.

6. In an electro-magnetic brake, the combination with a moving element, of magnet cores having polar extensions, which polar extensions are adapted to frictionally contact with the moving element upon the energization of any of the coils wound on the cores, two or more coils arranged on a single core, and means for energizing the coils of like relation to the polar extensions, substantially as set forth.

7. In an electro-magnetic brake, the combination with magnet cores, having polar extensions, of two or more coils arranged on a single core, and means for energizing the coils of like relation to the polar extensions, substantially as described.

WILLIAM L. HEDENBERG.

Witnesses:
T. F. BOURNE,
S. B. MORSS.